United States Patent [19]
Srinivasan et al.

[11] Patent Number: 6,026,408
[45] Date of Patent: Feb. 15, 2000

[54] METHOD FOR SYNCHRONIZING THE SCHEMA OF A DATABASE WITH ITS REPRESENTATION IN AN OBJECT-ORIENTED REPOSITORY

[75] Inventors: Uppili Rangarajan Srinivasan, Irvine; Max Tardiveau, Las Flores, both of Calif.

[73] Assignee: Unisys Corp., Blue Bell, Pa.

[21] Appl. No.: 09/014,302

[22] Filed: Jan. 28, 1998

[51] Int. Cl.[7] .................................................. G06F 17/30
[52] U.S. Cl. ............................ 707/103; 707/3; 707/10; 707/102; 709/248
[58] Field of Search ..................... 707/101, 102, 707/103, 104, 10, 501, 4, 7, 3, 202, 204, 8, 203, 201; 345/345, 346, 348; 709/248, 400, 303; 364/222, 285

[56] References Cited

U.S. PATENT DOCUMENTS

| | | | |
|---|---|---|---|
| 5,557,793 | 9/1996 | Koerber | 707/103 |
| 5,684,984 | 11/1997 | Jones et al. | 707/10 |
| 5,862,325 | 1/1999 | Reed et al. | 395/200 |
| 5,887,143 | 3/1999 | Saito et al. | 709/248 |
| 5,911,139 | 6/1999 | Jain et al. | 707/3 |

*Primary Examiner*—Wayne Amsbury
*Assistant Examiner*—Thu-Thao Havan
*Attorney, Agent, or Firm*—J. Ronald Richebourg; Mark T. Starr; Steven B. Samuels

[57] ABSTRACT

The present invention is an object-oriented apparatus stored in the memory of a computer system for executing a method for synchronizing schemas between a database and an object-oriented repository. The method includes the steps of initializing a variable, object X, which is of type, Type, with the object on which this method was called and obtaining values for each attribute of the object X from the database. Next, for each attribute of the object X, a comparison is made of the value obtained in the preceding step with value of attribute stored in the repository. A determination is next made as to whether or not any differences were found in the preceding step. If no differences were found, then a determination is made as to whether or not there are more attributes in the object X, and if so, repeat all steps except the first one.

10 Claims, 13 Drawing Sheets

IMPORT
FIG. 3

SYNCHRONIZE

FIG. 4A

SYNCHRONIZE

FIG. 4B

EXPORT

FIG. 5A

EXPORT

METHOD FOR SYNCHRONIZING THE SCHEMA OF A DATABASE WITH ITS REPRESENTATION IN AN OBJECT-ORIENTED REPOSITORY

FIELD OF THE INVENTION

The present invention generally relates to databases for computer systems and in particular to an improved method for administering one or more databases by the use of an object-oriented repository.

BACKGROUND OF THE INVENTION

In a large computing enterprise, various departments typically employ different databases possibly with redundant schema information. The term "schema" as used herein shall mean definitional information that provides information about or documentation of other data stored within a database. The proliferation of databases within an enterprise makes it extremely difficult for database administrators to manage the data and provide correct schema information rapidly. Also, since departments have been managing their own database without interacting with each other, the integrity of the data could be lost. Moreover, since the databases do not support maintaining a history of the database schemas, it is difficult for administrators to restore to old versions and also efficiently create and manage schema. By storing and maintaining a history of database schemas in an object-oriented repository that supports versioning, those schemas can be better managed. Storing the database schemas in a repository helps with data warehousing and provides for easy access to meta information.

A database technology model, which employs an embodiment of the present invention, provides three functions: import, export and synchronize. Using the import and synchronize functions, a user can maintain in the repository a version history of a database schema. Also, a user can update the database schema with a repository version of the schema by exporting the differences between the two database schemas to a file in data definition language (DDL) format, and then use the DDL statements to make the changes in the database.

The import, export, and synchronize operations generate and store reports in the repository as instances of a log file. A user can view the reports by using the log file operations as follows:

Import: The import operation connects to the database, reads the catalog information and stores that information in the repository. Many types in the DB technology model have an import operation. When a user imports a composite object, the object is imported and, recursively, all the component objects it contains are imported. For example, in the case of a relational database when a database object is imported, tables and procedures are imported. Also, when the table object is imported, columns, indexes, keys, constraints and triggers are imported.

Export: The export operation sends requested schema data to a file in DDL format. Export sends only the differences between the database schema and the version of the schema in the repository. The DDL statements can be used to update the database schema. The export operation functions recursively in the same manner as the import operation.

Synchronize: The synchronize operation maintains histories of database schemas as they change. The synchronize operation compares objects in a database schema with the objects in the repository copy of the same schema. If the synchronize operation finds differences, the differences are copied to the repository and assigned the next higher version number. The synchronize operation invokes the versioning operation which versions all objects in a composite hierarchy up to the database object. The synchronize operation does not create variant branches in a version graph; it creates only mainline branches. The synchronize operation functions recursively in the same manner as the import and export operations.

SUMMARY OF THE INVENTION

This invention provides methods for synchronizing and maintaining a history of database schemas in the repository thereby providing a common place for all the schema to be stored and also for facilitating better schema information management.

More specifically, the present invention is an object-oriented apparatus stored in the memory of a computer system for executing a method for synchronizing schemas between a database and an object-oriented repository. The method includes the steps of initializing a variable, object X, which is of type, Type, with the object on which this method was called and obtaining values for each attribute of the object X from the database. Next, for each attribute of the object X, a comparison is made of the value obtained in the preceding step with value of attribute stored in the repository. A determination is next made as to whether or not any differences were found in the preceding step. If no differences were found, then a determination is made as to whether or not there are more attributes in the object X, and if so, repeat all steps except the first one.

An important feature of the present invention is the capability of maintaining a history of database schemas in a repository as schemas change in the database.

Another feature of the present invention is the capability of storing and managing database schemas in an object-oriented repository environment.

Yet another feature of the present invention is the capability of designing a database schema in a repository and using it to create the schema information in a database.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims.

DETAILED DESCRIPTION OF ONE EMBODIMENT

A background of object oriented programming concepts and related definitions, which are helpful in understanding the apparatus and method described herein, are set forth hereinbelow:

Object-oriented programming is defined as a method of implementation in which programs are organized as cooperative collections of objects, each of which represents an instance of some type. See a text entitled *Object-Oriented Analysis and Design,* by Grady Booch, 1994.

An object is an abstract representation of a real-world concept or thing—such as a person, a software package, or an event. In a computer system memory, the state of an object is represented by the values of instance variables defined for the object's type. For example, the state of a person object might be a name, birth date, spouse, etc.

The behavior of an object is the set of operations that the object can perform. In the computer system, the behavior of an object is represented by the operations defined for the object's type.

Objects in the memory of a computer system represent real-world or conceptual entities. An object occupies a portion of memory which contains named instance variables for storing information about the entity. An object also provides operations that can be performed by the computer processor for accessing and modifying the information.

Types

A type is a template that describes the instance variables and operations that an object possesses. A type defines a pattern that can be used to create or identify objects; it does not contain the actual object. A type can also be a base for other types.

Objects described by a type are called instances of that type. Types derived from a base type are called subtypes of that type. A type that is used to define only other types and not objects is said to be abstract.

The definition of a subtype identifies the base types from which it is derived. A type cannot be a subtype of itself. A subtype inherits all the instance variables and operations of its base types. It can be customized by adding new instance variables and operations. For example, a type called Manager defined as a subtype of Employee would inherit all the instance variables and operations of Employee and would define additional instance variables and operations of its own. An object of type Manager would then have all the instance variables defined by the Employee and Manager types, and would have all the operations defined by both types.

Instance Variables

The memory used by an object contains instance variables. Each instance variable has a type, which defines the range of values that can be stored in the variable.

Operations

An operation is a feature that represents a behavior that objects possess. The operations defined for a type form an interface that can be seen by users of objects of that type. An operation can have parameters that identify information a caller must provide when invoking the operation. If an operation has no parameters, a caller merely invokes the operation for the desired object.

Methods

Each operation must be implemented by a module of code called a method. A method is the steps performed to complete an operation.

A composite object is a group of objects treated as a single object.

A repository enables the user to store, manage, share and reuse information about the information system in which the repository is used. The repository enables the user to store more than just the data that is processed by an information system. For example, definition data stored in the repository may be information about the development of applications; including descriptions of data, programs and system objects. It may also include information about relationships among data, programs and system objects; as well as the semantics and use of the information.

Examples of definition information might include the files and programs that form a salary administration application. This application might define the minimum and maximum salaries at a given level. Another example is management information used to manage and maintain definition information. Management information also describes who can use definition information and when, where and why the information is used. For example, the salary administration application might be accessible only to a select group of repository users.

Yet another example is operational information about the environment in which the user operates. Examples of this information include system configuration, backup information and schedules. For more information on an object-oriented repository, reference is made to one or more of the following U.S. Patents, all of which are assigned to the assignee hereof:

U.S. Pat. No. 5,557,793 entitled IN AN OBJECT ORIENTED REPOSITORY, A METHOD FOR TREATING A GROUP OF OBJECTS AS A SINGLE OBJECT, by Paul Koerber;

U.S. Pat. No. 5,581,755 entitled A METHOD FOR MAINTAINING A HISTORY OF SYSTEM DATA AND PROCESSES FOR AN ENTERPRISE by Paul Koerber and Ron Neubauer;

U.S. Pat. No. 5,644,764 entitled A METHOD FOR SUPPORTING OBJECT MODELING IN A REPOSITORY by Peter Johnson and Sridhar Iyengar;

U.S. Pat. No. 5,671,398 entitled A METHOD FOR COLLAPSING A VERSION TREE WHICH DEPICTS A HISTORY OF SYSTEM DATA AND PROCESSES FOR AN ENTERPRISE by Ron Neubauer; and U.S. Pat. No. 5,701,472 entitled A METHOD FOR LOCATING A VERSIONED OBJECT WITHIN A VERSION TREE DEPICTING A HISTORY OF SYSTEM DATA AND PROCESSES FOR AN ENTERPRISE by Paul Koerber and Ron Neubauer.

Figure 1:
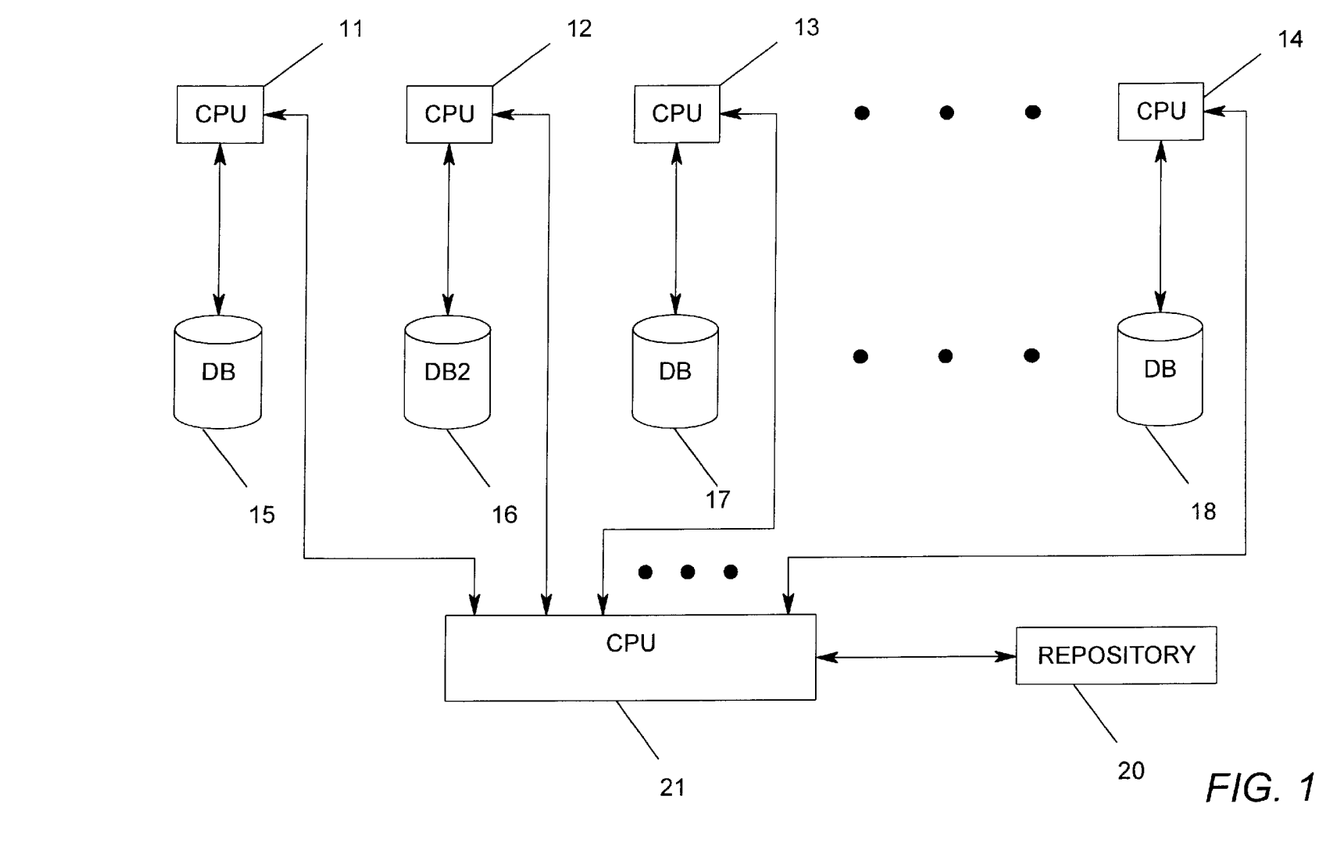
FIG. 1 is a block diagram showing a multiplicity of computing systems each having a database coupled thereto and a repository and a CPU disposed for executing the method of the present invention.

Referring now to the drawings and to FIG. 1 in particular, a block diagram shows a multiplicity of CPU's 11 through 14 each having a database 15 through 18, respectively, coupled thereto and a universal repository 20 and CPU 21 executing the method of the present invention. Each of the CPU's 11–14 are coupled to the CPU 21 as will be illustrated hereafter. It is noted that more than four CPU's with a corresponding database may be coupled to the CPU 21, as illustrated by the ellipses. As will be amplified in greater detail hereinbelow, the method of the present invention allows for administering schema information for the databases 15–18 by the use of the repository 20.

Figure 2:
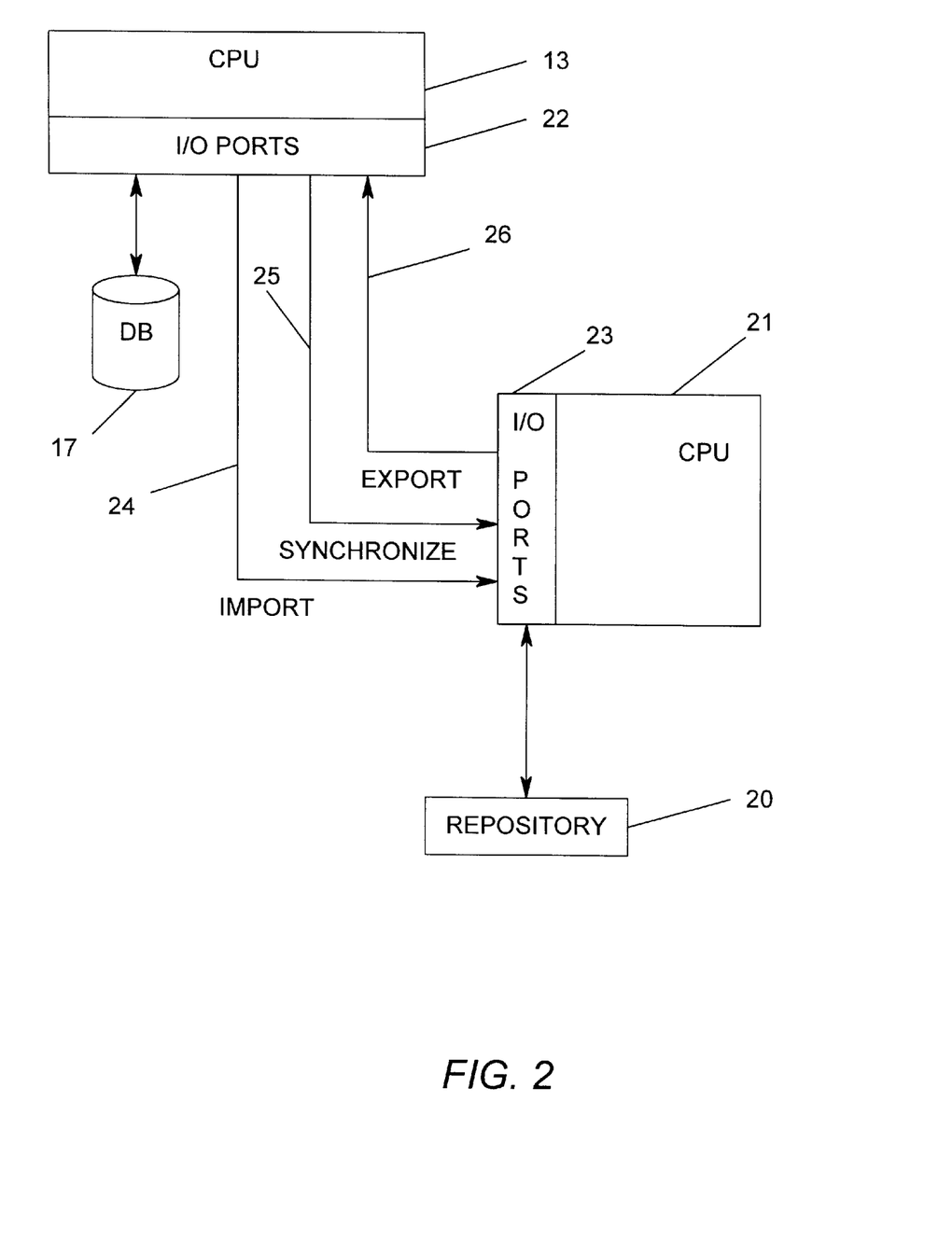
FIG. 2 is a block diagram showing the interaction between an individual CPU, a database and the repository.

Referring now to FIG. 2, a block diagram shows the interaction between the CPU 13, the database 17 and the repository 20. The three lines shown between I/O ports 22 of the CPU 13 and I/O ports 23 of the CPU 21 depict the three functions provided by the database technology model alluded to hereinabove. First, line 24 depicts the Import operation, line 25 depicts the Synchronize operation and line 26 depicts the Export operation.

Import: this operation (when invoked) connects to the database, reads the catalog information and then stores the information in the repository. When this operation is called on a composite object, it imports itself and then recursively imports all of the objects it contains. If the "contained" object itself is a composite object, it then imports itself and imports the objects it contains. For example, in the case of a relational database when the database object is imported, it imports tables and procedures. When the import operation on table is invoked, it imports columns, indexes, keys, constraints, and triggers.

Export: this operation exports the database schema information to a database in the form of DDLs. DDL stands for Data Definition Language, which may be used to create or modify properties of objects in a database. During export, only the discrepancies found when the database schemas are compared are exported. Export works recursively in the same manner that Import works recursively.

Synchronize: this operation is the highlight of the integration. When this operation is invoked, it synchronizes the schemas between the database and the repository. The objects for which differences are found are versioned in the repository, thereby maintaining a history of the database schemas as they change in the database. Just as Import and Export work recursively, so does Synchronize. Another important point here is that when a "contained" object is versioned, the "container" object is also versioned. For example, if a column is versioned, the table that contains it is versioned and the database that contains the table is versioned. All three operations will generate a report that will be stored in the repository as an instance of a log file. This way the user sitting at the client side can view the reports by using the operations in the log file.

Figure 3:
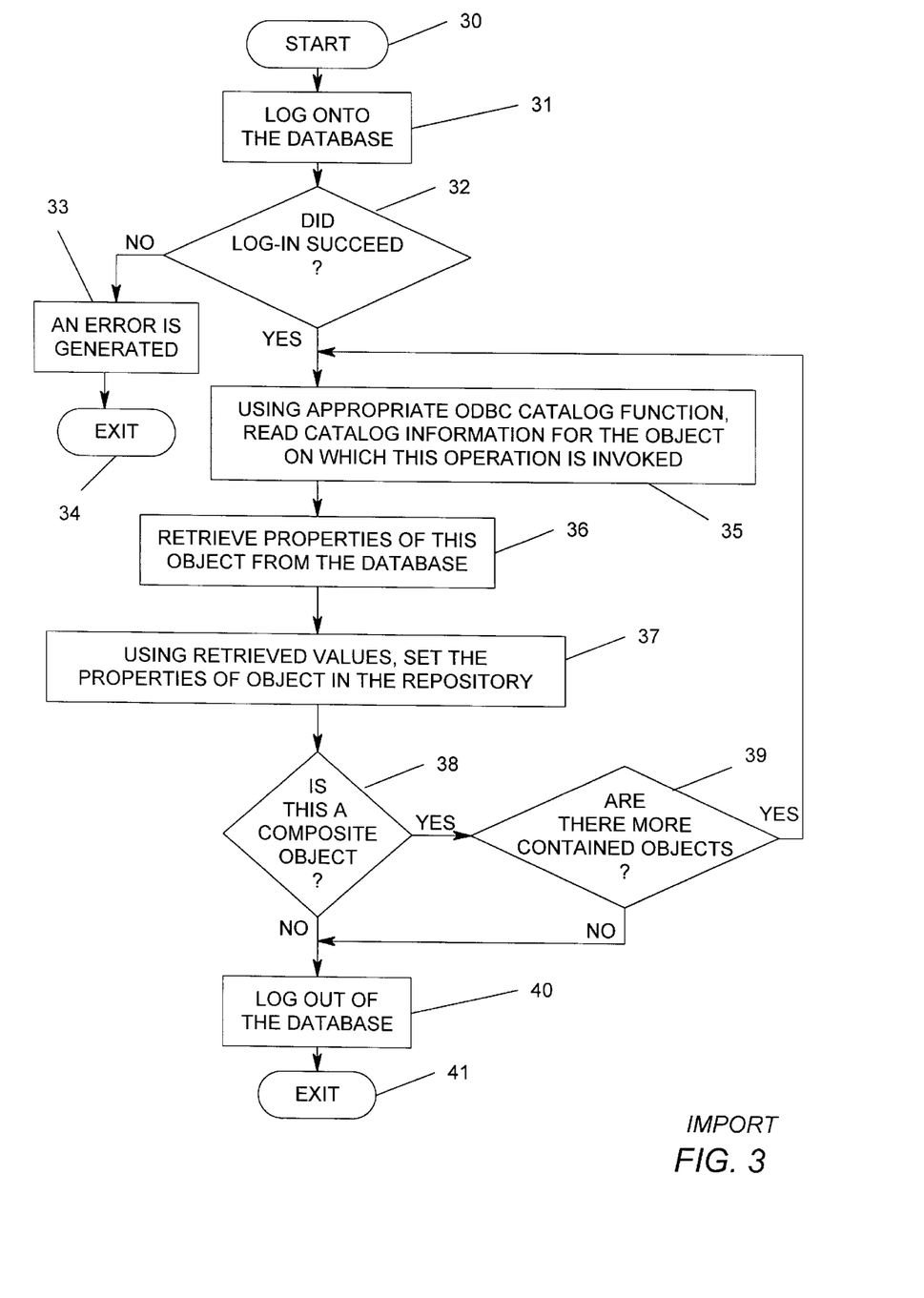
FIG. 3 is an overall flow chart illustrating the Import operation.

Referring now to FIG. 3, an overall flow chart illustrates the Import operation. The process begins with a start bubble 30 followed by a step of logging onto the database (block 31). Next, an inquiry is made as to whether or not the log-in was successful (diamond 32). If the answer to this inquiry is no, then the error is generated (block 33) and the process is exited (bubble 34). On the other hand, if the log-in was successful (yes branch from the diamond 32), then a process step is performed, using the appropriate ODBC catalog function, by reading catalog information for the object on which this operation is invoked (block 35).

Following the above, properties of this object are retrieved from the database (block 36). Next, using the retrieved values, the properties of object are set in the repository (block 37). Next, an inquiry is made as to whether or not this is a composite object (diamond 38). If the answer to this inquiry is yes, then another inquiry is made as to whether or not there are more contained objects (diamond 39). If the answer to this second inquiry is yes, then a return is made back to the step depicted by the block 35 to process the next contained object. On the other hand, if the answer to this inquiry is no, or the answer to the inquiry depicted by the diamond 38 is no, then a log out of the database is made (block 40) and the process is exited (bubble 41).

Figure 4A:
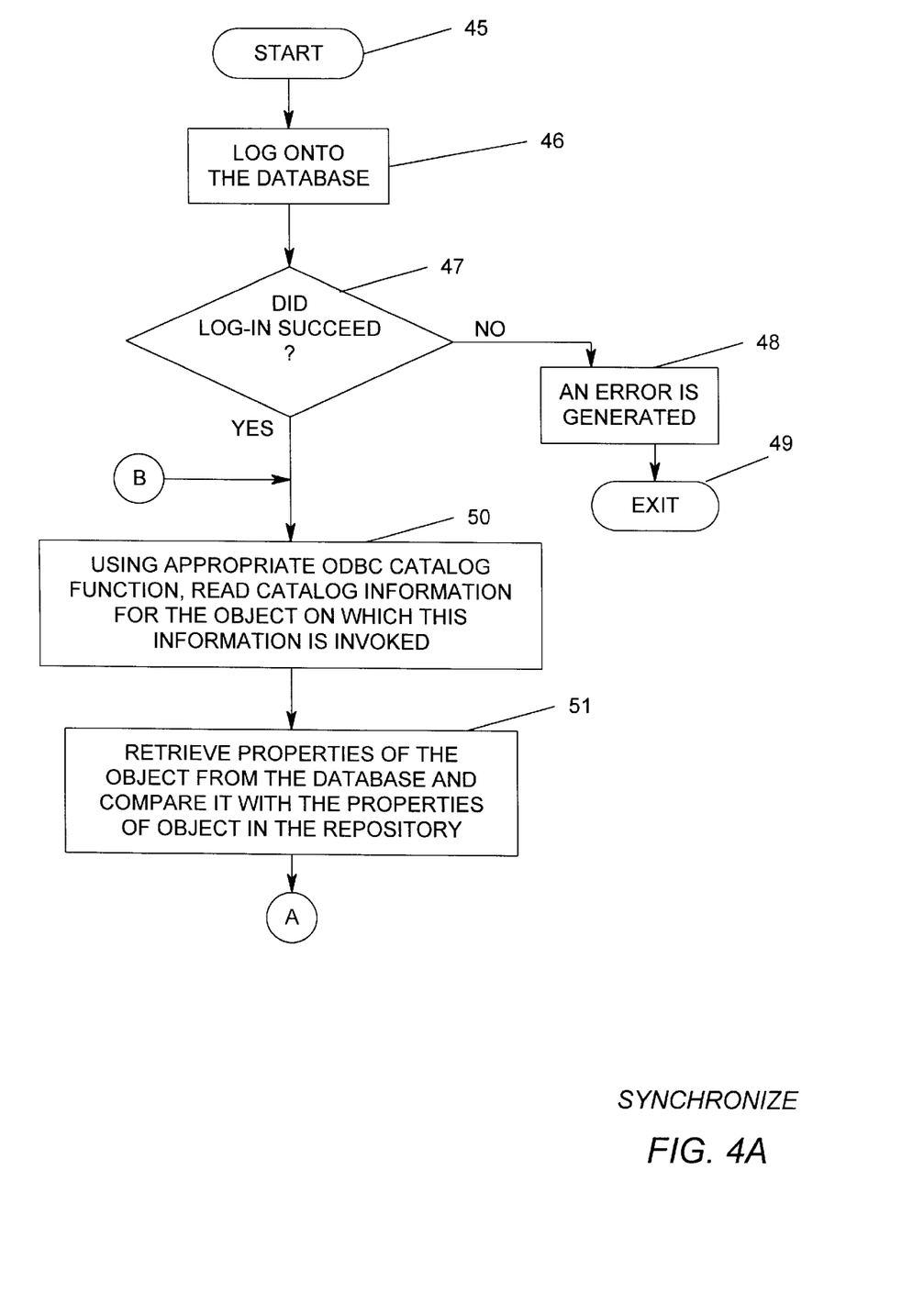
FIGS. 4A and 4B combined form an overall flow chart illustrating the Synchronize operation.

Referring now to FIG. 4A, the first a two-sheet overall flow chart is shown for the Synchronize operation. The process begins with a start bubble 45 followed by logging onto the database (block 46). Next, an inquiry is made as to whether or not the log-in succeeded (diamond 47). If the answer to this inquiry is no, then an error is generated (block 48), and the process is exited (bubble 49).

If the log-in was successful, then using the appropriated ODEC ("Open DataBase Connectivity") catalog function, the catalog information is read for the object on which this information is invoked (block 50). ODBC is used in order to interface with any of the databases. Moreover, only the catalog functions in ODBC are used since it is the catalog information and not the real data that is of interest. Next, properties of the object are retrieved from the database and compared with the properties of the object in the repository (block 51). The process illustration continues in FIG. 4B as depicted by a bubble A.

Figure 4B:
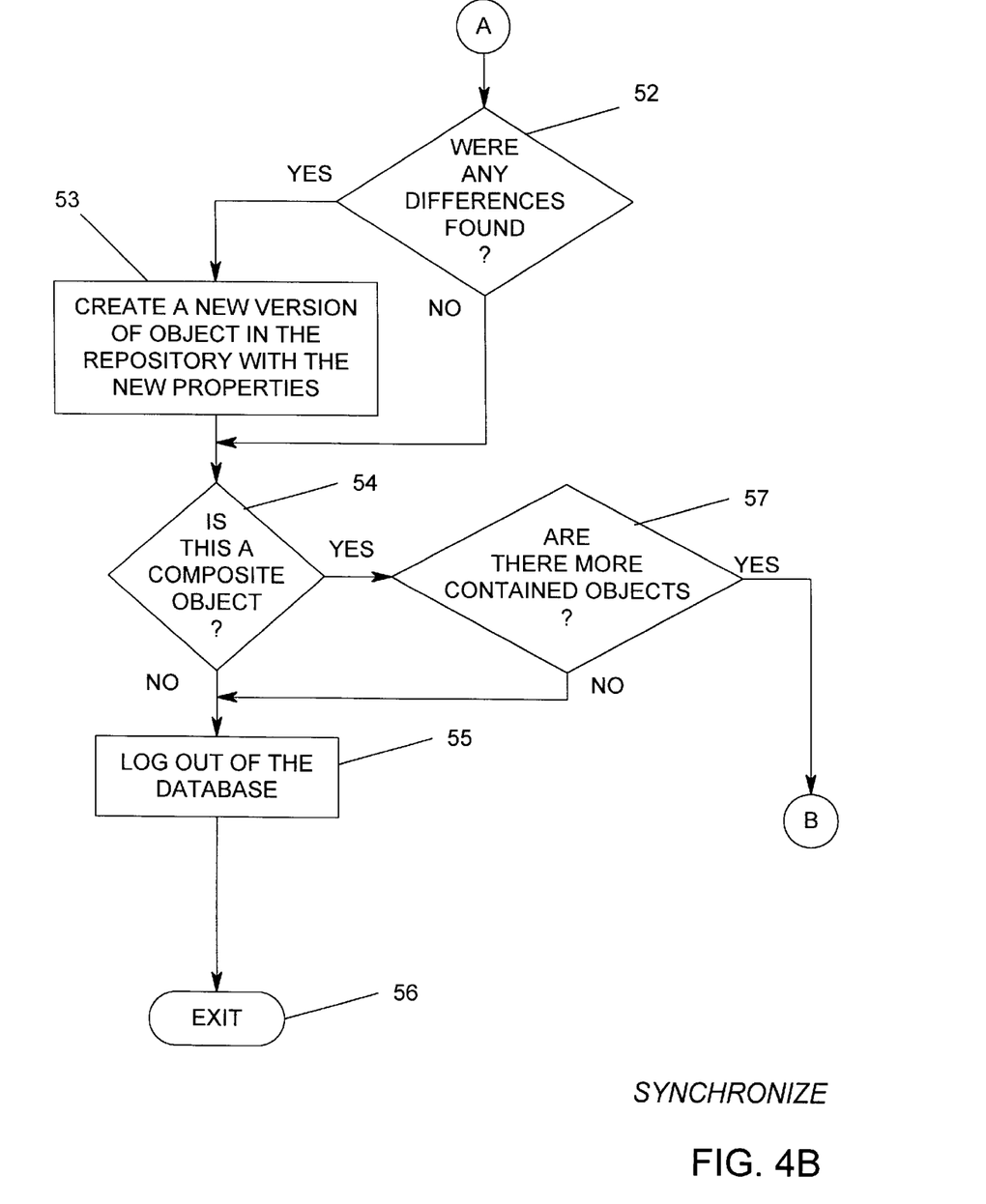

With reference to the bubble A in FIG. 4B, another inquiry is made as to whether or not there were any differences found in the preceding step (diamond 52). If the answer to this inquiry is yes, then a new version of the object is created in the repository with the new properties (block 53). If the answer to this inquiry is no, or upon completion of the step depicted by the block 53, yet another inquiry is made as to whether or not this is a composite object (diamond 54). If the answer to this inquiry is no, then a log out of the database is made (block 55) and the process is exited (bubble 56).

On the other hand, if the answer to the inquiry depicted by the diamond 54 is yes, then still another inquiry is made as to whether or not there are more contained objects (diamond 57). If the answer to this inquiry is yes, then a return is made back to the step depicted by the block 50 (FIG. 4A), as denoted by a connector B, for processing the next contained object. If there are no more contained objects to be processed (no leg of the diamond 57) or if this is not a composite object (no leg of the diamond 54), then a log out of the database is made (block 55) followed by an exit from the process (bubble 56).

Figure 5A:
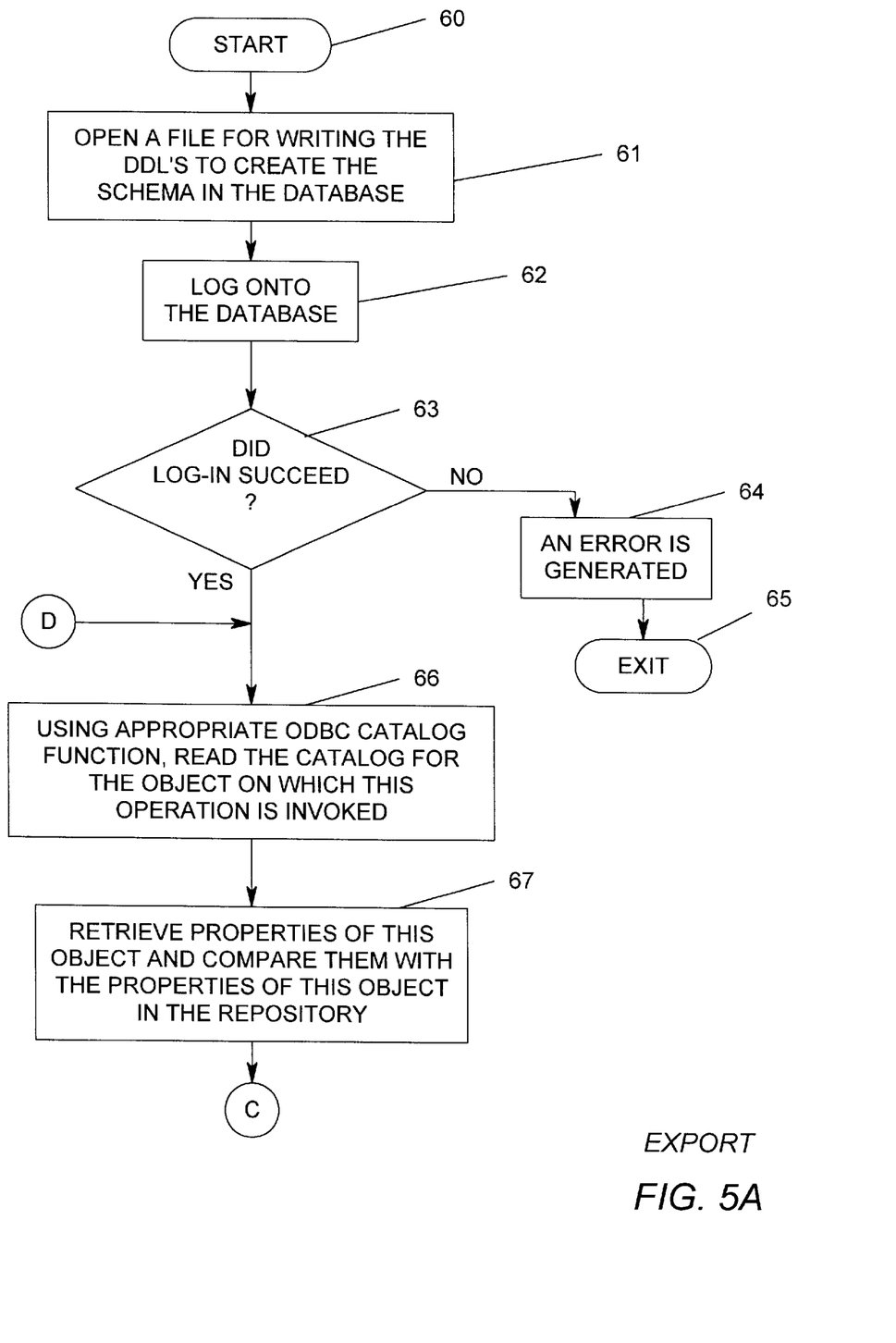
FIGS. 5A and 5B combined form an overall flow chart illustrating the Export operation.

Referring now to FIG. 5A, an overall flow chart illustrates the Export process. The process begins with a start bubble 60 followed by a process step of opening a file for writing the DDL's to create the schema in the database (block 61). Next, a log onto the database is made (block 62). Following, this an inquiry is made as to whether or not the log-in was successful (diamond 63). If the answer to this inquiry is no, then an error is generated (block 64) and the process is exited (bubble 65).

On the other hand, if the answer to the inquiry depicted by the diamond 63 is yes, then by using the appropriate ODBC catalog function, the catalog is read for the object on which this operation is invoked (block 66). Next, the properties of this object are retrieved and compared with the properties of this object in the repository (block 67). The process illustration continues in FIG. 5B as depicted by a connector C.

Figure 5B:
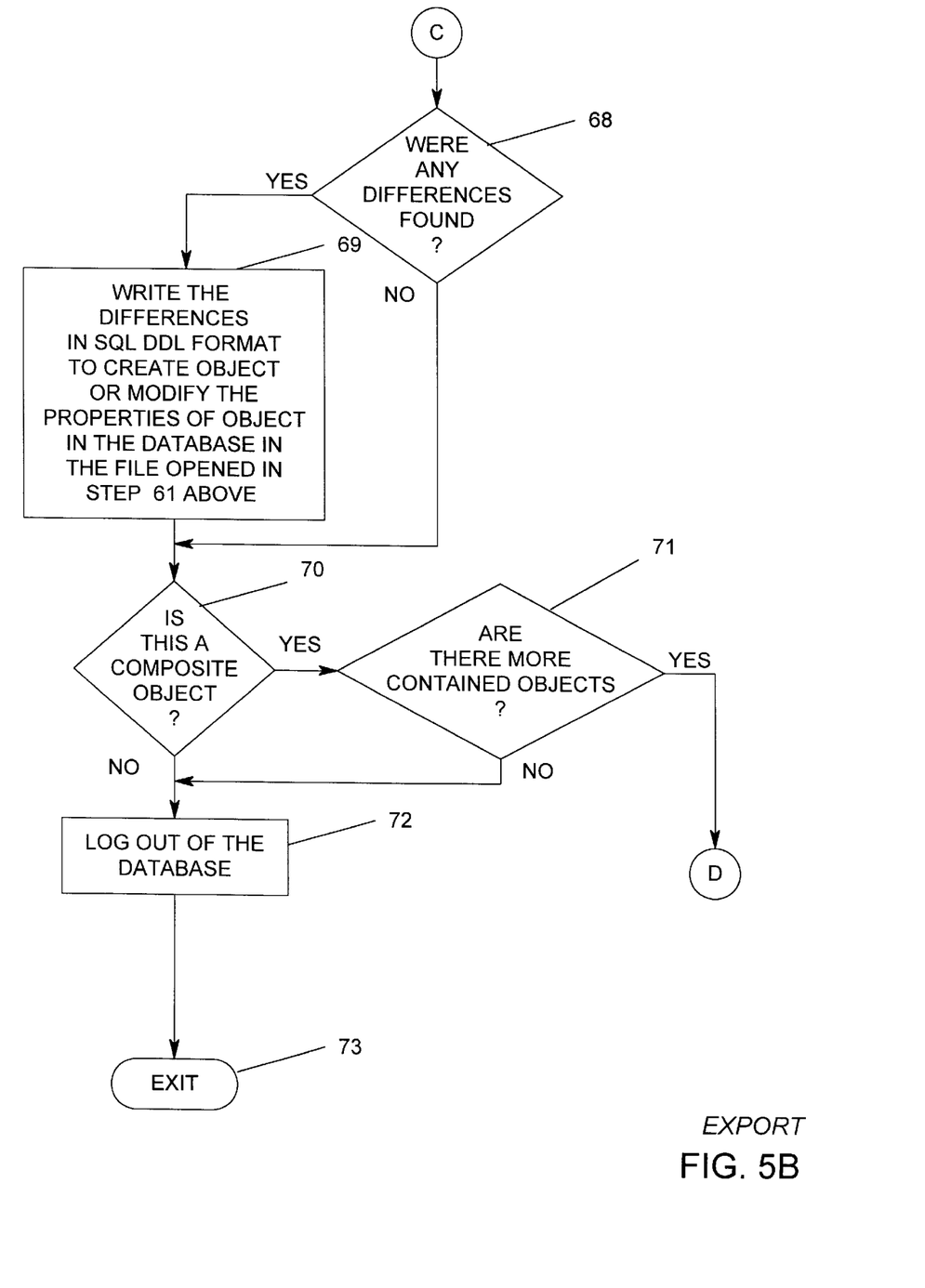

Referring now to FIG. 5B at the connector C, another inquiry is made as to whether or not there were any differences found in the preceding step (diamond 68). Next, the differences are written in SQL DDL format to create an object or to modify the properties of the object in the database in the file opened in the step depicted by the block 61 (FIG. 5A). Following this, an inquiry is made as to whether or not this is a composite object (diamond 70). If the answer to this inquiry is yes, then another inquiry is made as to whether or not there are more contained objects (diamond 71). If the answer to this second inquiry is yes, then a return is made back to the step depicted by the block 66 to process the next contained object, as denoted by a connector D.

On the other hand, if the answer to the inquiry in the diamond 70 or 71 is no, then a log out of the database is made (block 72) and the process is exited (bubble 73).

Figure 6A:
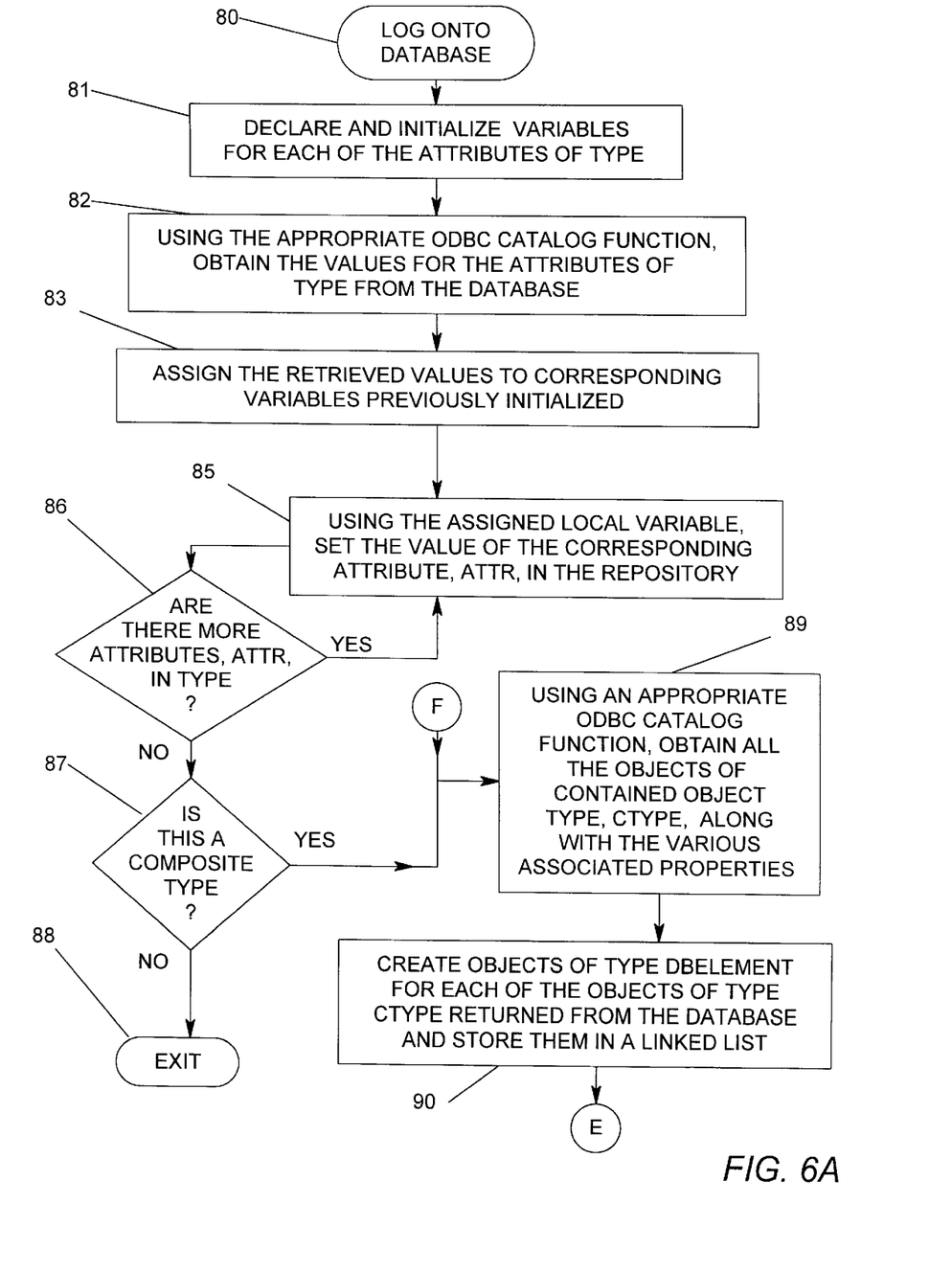
FIGS. 6A and 6B combined form a detailed flow chart illustrating the process for importing database schema into an object-oriented repository.

Referring now to FIG. 6A, the first of a two-sheet flow chart illustrates the process for importing database schema into an object-oriented repository for a particular type, Type, in the database technology model (i.e., the Import process). The process begins with a log onto the database (bubble 80) followed by a process step of declaring and initializing variables for each of the attributes of Type (block 81). Next, using the appropriate ODBC catalog function, the values for the attributes of Type are obtained from the database (block 83). Following this, the retrieved values are assigned to corresponding variables previously initialized (block 83).

Using the assigned local variable, the value of the corresponding attribute, ATTR, is set in the repository (block 85). Next, an inquiry is made as to whether or not there are more attributes, ATTR, in Type (diamond 86). If the answer to this inquiry is yes, then the step depicted by the block 85 is repeated. On the other hand, if the answer is no then another inquiry is made as to whether or not this is a composite type (diamond 87). If the answer to this inquiry is no, then the process is exited (bubble 88).

If the answer to the inquiry depicted by the diamond 87 is yes, then a process step is performed using an appropriate ODBC catalog function by obtaining all the objects of the contained object type, Ctype, along with the various associated properties (block 89). Next, objects of a type, identified herein as DBElement, are created for each of the objects of the type, Ctype, returned from the database and stored in a list (block 90). The term "DBElement" as used herein refers to an internal class that is used to store values retrieved from a database. The process illustration continues in FIG. 6B as denoted by a connector E.

Figure 6B:
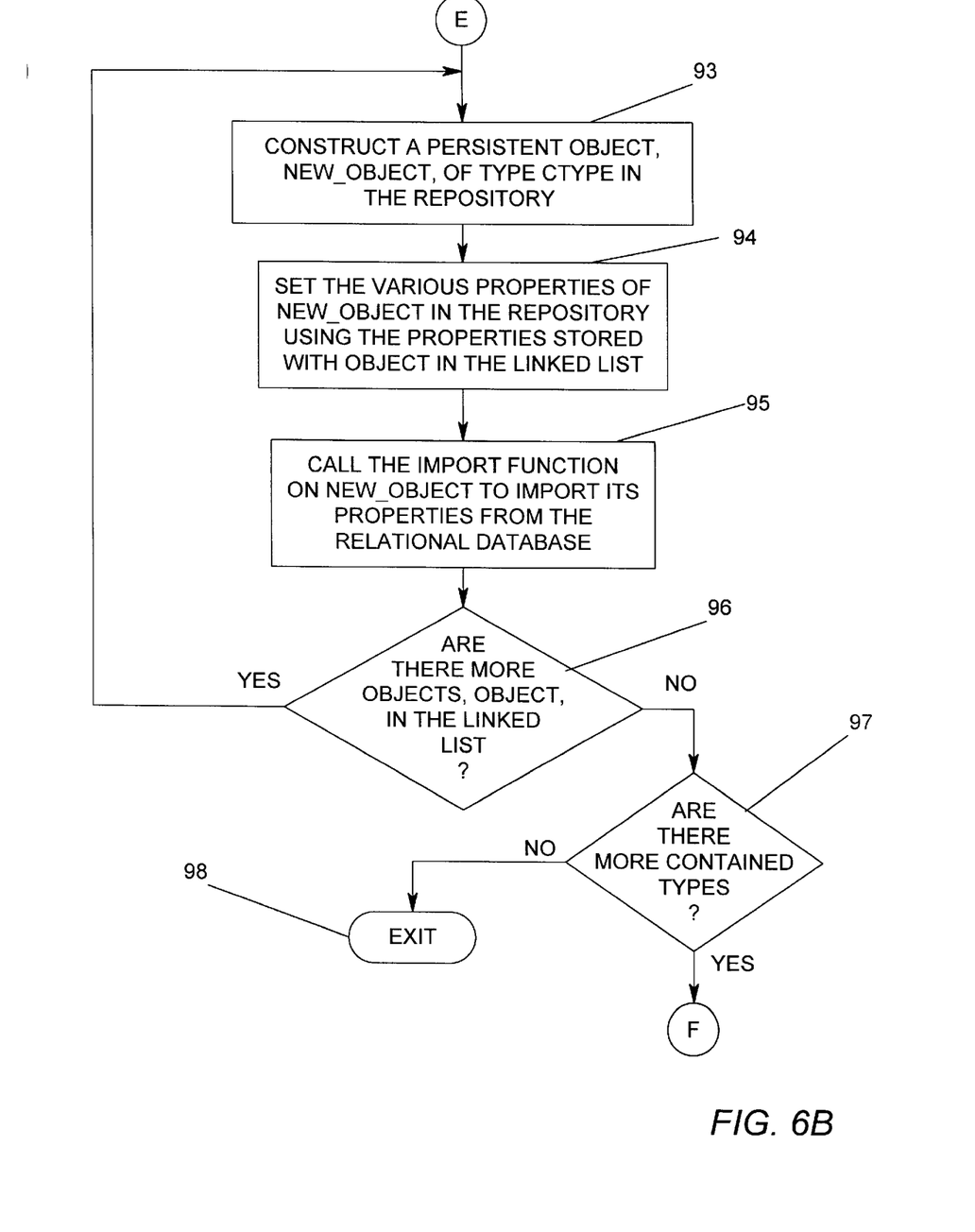

Referring now to FIG. 6B at the connector E, a persistent object, NEW_OBJECT, of type, Ctype, is constructed in the repository (block 93). Then, the various properties of NEW_OBJECT are set in the repository using the properties stored with object in the linked list (block 94). Following this, the import function on NEW_OBJECT is called to import its properties from the database (block 95).

An inquiry is next made as to whether or not there are more objects, Object, in the list (diamond 96). If the answer to this inquiry is yes, then a return is made back to the step depicted by the block 93 for processing the next object in the list. On the other hand, if the answer to this inquiry is no, then another inquiry is made as to whether or not there are more contained types (diamond 97). If the answer to this inquiry is yes, then a return is made back to the process step depicted by the block 89 (FIG. 6A). On the other hand, if the answer to this inquiry is no, then the process is exited (bubble 98).

Figure 7A:
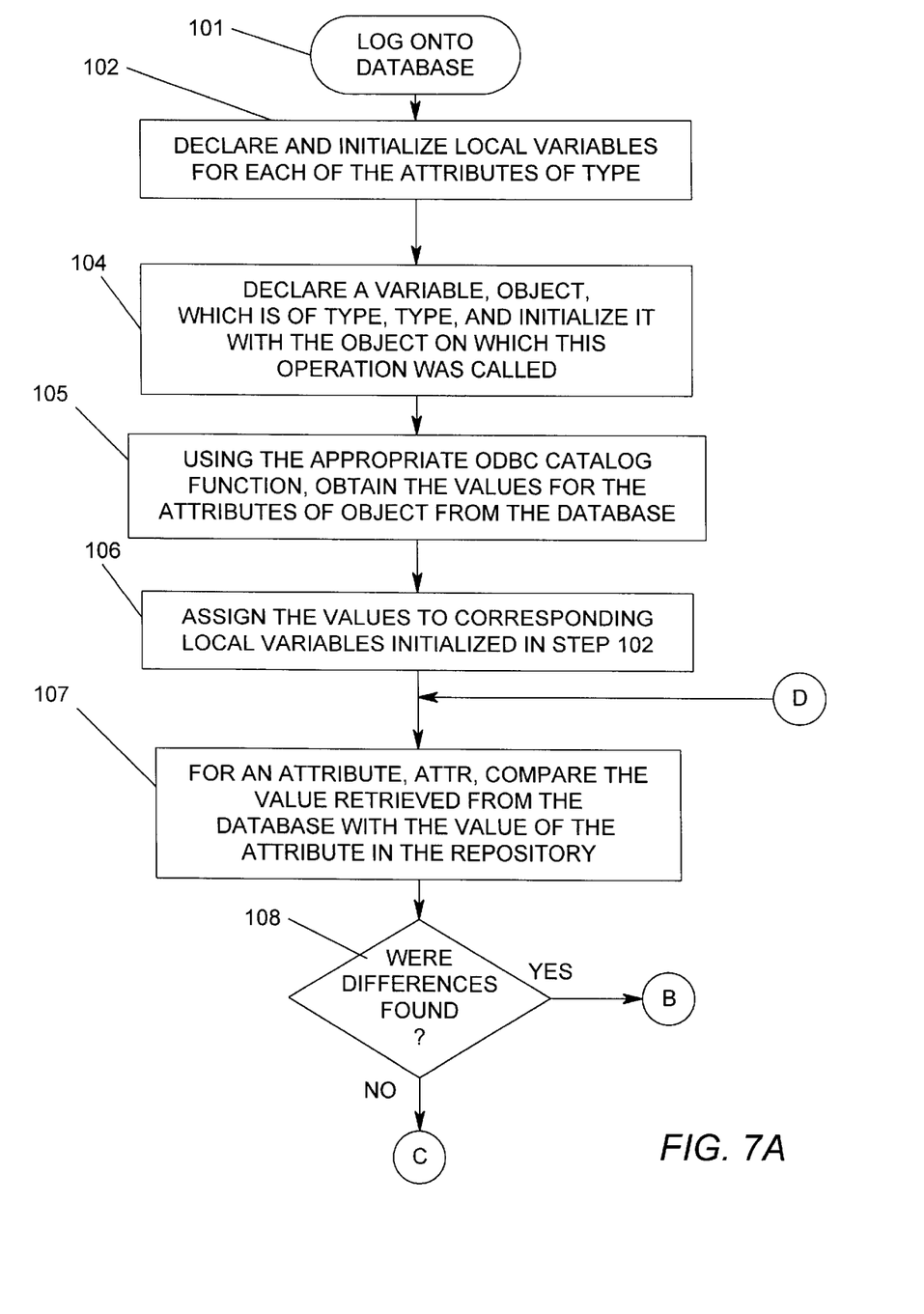
FIGS. 7A through 7D combined form a detailed flow chart illustrating the process for synchronizing a database schema with a corresponding schema stored in the repository.

Referring now to FIG. 7A, the first of a detailed four-sheet flow chart illustrates the process for synchronizing a database schema with a corresponding schema stored in the repository for a particular type, Type, in the database technology model (i.e., Synchronize process). The process begins with a log onto the database (bubble 101) followed by a process step of declaring and initializing local variables for each of the attributes of Type (block 102). Next, a variable, Object, is declared, which variable is of type, Type, and it is initialized with the object on which this operation was called (block 104). Using the appropriate ODBC catalog function, the values for the attributes of type from the database are obtained (block 105).

Values are next assigned to corresponding local variables initialized in the step depicted by the block 102 (block 106). Following this, for an attribute, ATTR, the value retrieved from the database is compared with the value of the attribute in the repository (block 107). An inquiry is then made as to whether or not any differences were found (diamond 108). If differences were found, a branch is taken to FIG. 7B at a connector B. On the other hand, if no differences were found a branch is taken to FIG. 7B at a connector C.

Figure 7B:
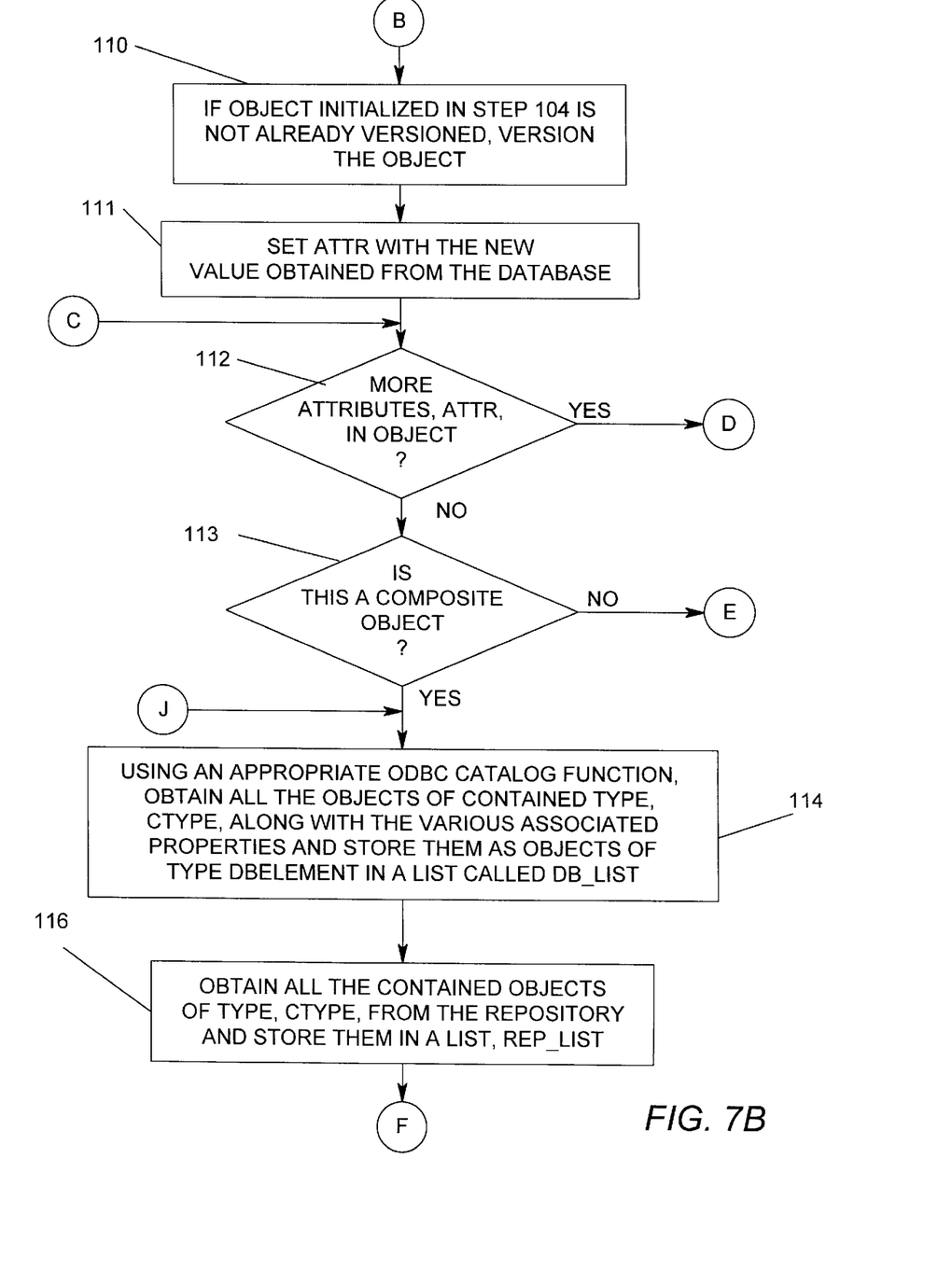

Referring now to FIG. 7B at the connector B, if the Object initialized in the step 104 is not already versioned, version the Object (block 110). Next, the attribute ATTR is set with the new value obtained from the database (block 111). An inquiry is then made as to whether or not there are more attributes, ATTR, in Object (diamond 112). If the answer to this inquiry is yes, then a return is made back to the step depicted by the block 107 (FIG. 7A) as denoted by a connector D. On the other hand, if the answer to this inquiry is no, then another inquiry is made as to whether or not this is a composite object (diamond 113). Note that the connector C from the no leg of the diamond 108 intersects the process at the inquiry 113.

If the answer to the inquiry in the diamond 113 is no, then a branch is taken to the exit bubble in FIG. 7D, as will be described hereinbelow. On the other hand, if the answer to this inquiry is yes, then using an appropriate ODBC catalog function, all the objects of contained type, Ctype, are obtained from the database along with the various associated properties and then stored as objects of type, DBElement, in a list called DB_LIST (block 114). Following this, all the contained objects of type, Ctype, are obtained from the repository and stored in a list, REP_LIST (block 116). The process illustration continues in FIG. 7C as depicted by a connector F.

Figure 7C:
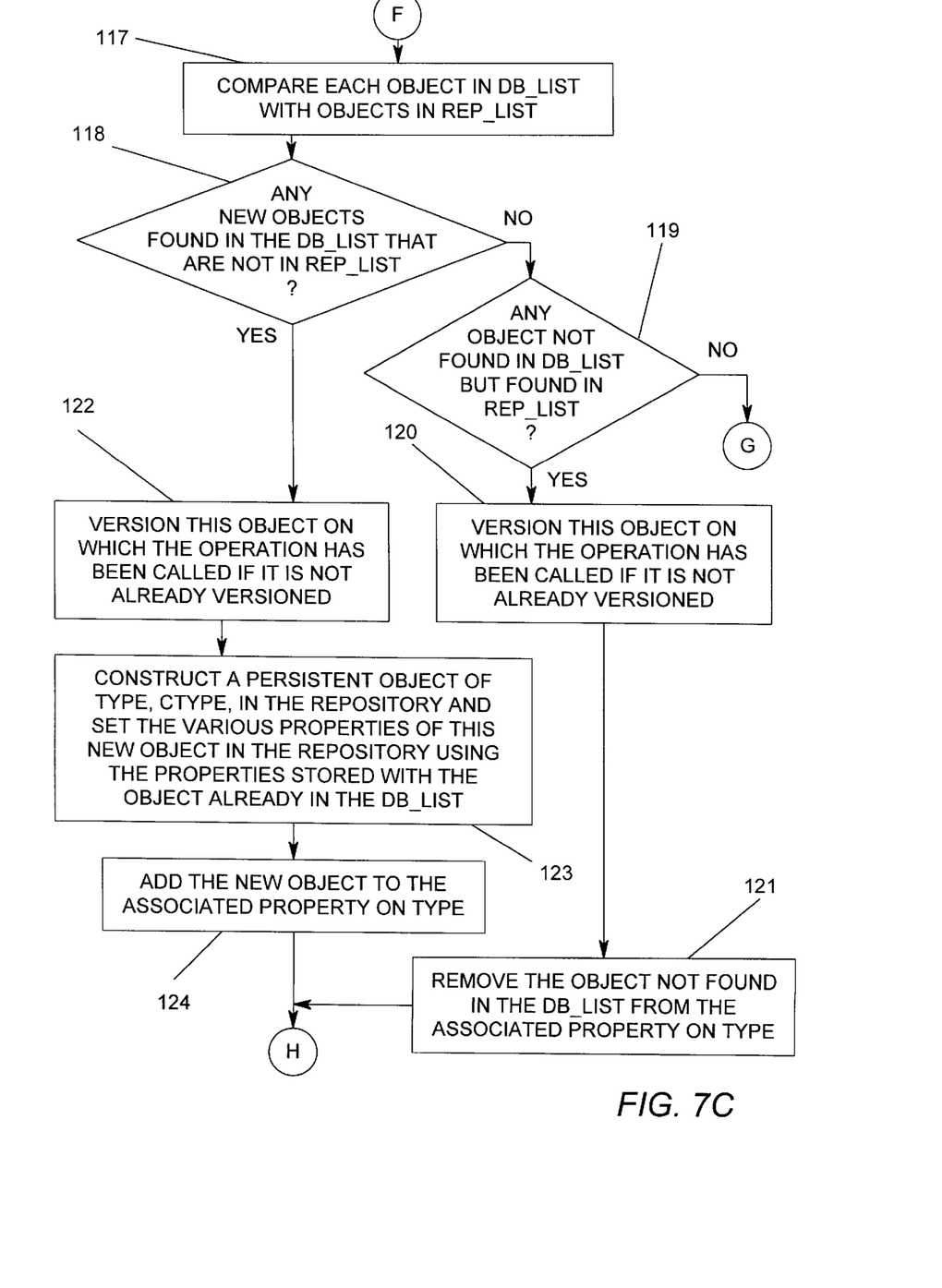

Referring now to FIG. 7C at the connector F, each object in the DB_LIST is compared with objects in REP_LIST (block 117). Next, an inquiry is made as to whether or not any new objects were found in the DB_LIST that are not in the REP_LIST (diamond 118). This is done to determine if more objects were found in the database compared to the repository. If the answer to this inquiry is no, then another inquiry is made as to whether or not any object not found in the DB_LIST was found in the REP_LIST (diamond 119). This is done to provide information on whether more objects of a particular type were found in the repository when compared to the database. If the answer to this inquiry is no, then a branch is taken to FIG. 7D and will be described hereafter as denoted by a connector G.

On the other hand, if the answer to the inquiry in the diamond 119 is yes, then this object (on which the operation has been called) is versioned if it is not already versioned (block 120). Next, this object (which was not found in the DB_LIST) is removed from the associated property on type (block 121) (this is done because one or more objects of a particular type have been removed from the database and the container object of this type of objects has to change to reflect the changes in the database) and a branch is taken to FIG. 7D at a connector H.

Returning to the diamond 118, if the answer to this inquiry is yes, then the object on which the operation was called is versioned if it is not already versioned (block 122). Next, a persistent object is constructed of type, Ctype, in the repository and the various properties of this new persistent object are set in the repository using the properties stored with the object already in the DB_LIST (block 123). Next, the new object is added to the associated property on type (block 124). This is done because one or more objects of a particular type have been created in the database and the container object of this type of objects has to change to reflect the changes in the database. The process illustration continues in FIG. 7D at a connector H.

Figure 7D:
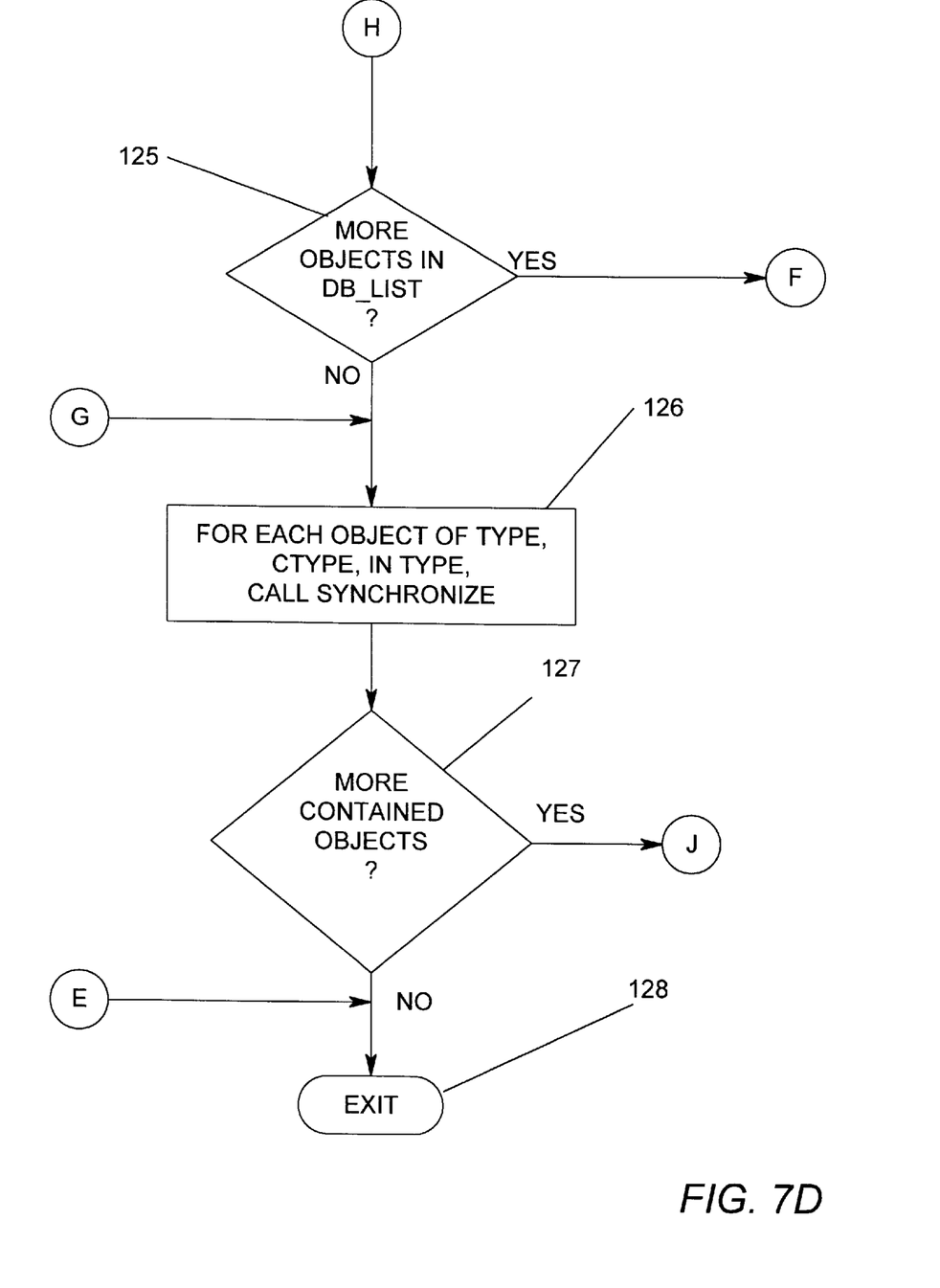

Referring now to FIG. 7D at the connector H, an inquiry is made as to whether or not there are more objects in the DB_LIST (diamond 125). If the answer to this inquiry is yes, then a return is made back to the connector F (FIG. 7C) to process the next object. On the other hand, if the answer to this inquiry is no, then for each of type, Ctype, in Type call Synchronize; that is, repeat the entire process illustrated in FIGS. 7A–7D (block 126). Note that the connector G from the diamond 120 (FIG. 7C) intersects the process at the block 126. Following this, another inquiry is made as to whether or not there are more contained objects (diamond 127). If the answer to this inquiry is yes, then a return is made back to the step depicted by the block 114 to process the next contained object as denoted by a connector J. After this, the process is exited (bubble 128). Note that the connector E from the diamond 113 (FIG. 7B) intersects the process at the bubble 128.

The method of the present invention includes integration that provides for migrating schema information between any database and the repository 20. As a result of storing database schemas in the repository, users can take advantage of the repository services, including maintaining a history of schemas in the repository. The integration also provides the capability to create a new schema for a database in the repository 20 and export it to a database. The database technology model developed as part of this integration will be used in storing the database schemas. As a result of this common technology model, various tools that are integrated with the repository can view/share the same database schema information.

The export operation functions recursively in the same manner as the synchronize operation. Hence, the export operation will not be described in detail.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In an object-oriented apparatus stored in the memory of a computer system a method for synchronizing the schema of a database with its representation in an object-oriented repository, said method comprising the steps of:
   a. initializing a variable, object X, which is of type, Type, with the object on which said method was called;
   b. obtaining values for each attribute of said object X from said database;
   c. for each attribute of said object X, comparing value obtained in the preceding step with value of attribute stored in said repository;
   d. determining if any differences were found in the preceding step, and if not;
   e. determining if there are more attributes in said object X, and if so;
   f. repeating steps b through e hereof.

2. The method as in claim 1 wherein it is determined in step e thereof that there are no more attributes in said variable X, further including the steps of:
   a. determining if said object X is a composite object, and if it is;
   b. obtaining all objects of contained type, Ctype, from said database along with various associated properties and storing them in a first list;
   c. obtaining all contained objects of type, Ctype, from said repository and storing them in a second list;
   d. comparing each object in said first list with each object in said second list and for each new object found in said first list not in said second list;
   e. versioning said object X on which said method is invoked if not already versioned;
   f. constructing a persistent object of type, Ctype, in said repository and setting properties of said new persistent object by using properties of said new object found in step d hereof in said first list;
   g. adding said persistent object to associated property on said object X; and,
   h. determining if there are more objects in said first list, and if so, returning to step d of claim 1.

3. The method as in claim 2 where it is determined in step a that this is not a composite object, further including the step of exiting said process.

4. The method as in claim 2 where in step d it is determined that no new objects were found in said first list that are not in said second list, further including the steps of:
   a. determining if any object not found in said first list is found in said second list, and if so;
   b. versioning said object X on which said method was called if it is not already versioned; and,
   c. removing each object not found in said first list from associated property on said object X.

5. The method as in claim 4 further including after step a thereof if there are more contained objects, and if so, repeating steps a through c of claim 4.

6. The method as in claim 5 where in step g it is determined that there are no more contained objects, further including the step of exiting said process.

7. The method as in claim 2 further including after step a thereof, if there are more contained objects, repeating steps b through g of claim 2.

8. The method as in claim 7 further including the step of repeating all steps of claim 1 for each contained object type, Type.

9. The method as in claim 1 when it is determined in step d that differences are found, further including the steps of:
   a. if said object X initialized in step a of claim 1 is not already versioned, versioning said object X; and,
   b. setting said attribute in step c of claim 1 of said object X with a new value obtained from said database.

10. The method as in claim 1 further including the step of repeating all steps of claim 1 for each object of type, Ctype, in Type.

* * * * *